United States Patent
Olivas et al.

(10) Patent No.: US 6,507,187 B1
(45) Date of Patent: Jan. 14, 2003

(54) ULTRA-SENSITIVE MAGNETORESISTIVE DISPLACEMENT SENSING DEVICE

(75) Inventors: John D. Olivas, Redondo Beach, CA (US); Bruce M. Lairson, Houston, TX (US); Rajeshuni Ramesham, Duarte, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/384,363

(22) Filed: Aug. 24, 1999

(51) Int. Cl.[7] .................. G01B 7/14; G01R 33/09; G01P 15/097; G01P 15/105; G01L 9/14
(52) U.S. Cl. .................. 324/207.21; 324/207.26; 324/252; 73/514.21; 73/514.31; 73/723; 73/862.69; 338/32 R
(58) Field of Search .................. 324/207.2, 207.21, 324/207.22, 207.26, 252, 259; 338/32 R; 73/514.21–514.24, 514.31, 717, 722, 723, 728, 862.625, 862.629, 862.634, 862.637, 862.639, 862.69

(56) References Cited

U.S. PATENT DOCUMENTS

| | | | | |
|---|---|---|---|---|
| 4,967,598 A | * | 11/1990 | Wakatsuki et al. | ... 73/514.31 X |
| 5,027,657 A | * | 7/1991 | Juckenack et al. | ... 73/DIG. 3 X |
| 5,561,368 A | * | 10/1996 | Dovek et al. | ............ 324/252 |
| 5,583,725 A | * | 12/1996 | Coffey et al. | ........... 324/252 X |
| 6,031,273 A | * | 2/2000 | Torok et al. | ............ 324/252 X |
| 6,131,457 A | * | 10/2000 | Sato | ........................ 73/514.31 |
| 6,166,539 A | * | 12/2000 | Dahlberg et al. | ........... 324/252 |
| 6,278,270 B1 | * | 8/2001 | Robles-Flores et al. | ..................... 324/207.21 |

FOREIGN PATENT DOCUMENTS

JP 5-142246 * 6/1993

* cited by examiner

Primary Examiner—Gerard R. Strecker
(74) Attorney, Agent, or Firm—John H. Kusmiss

(57) ABSTRACT

An ultrasensitive displacement sensing device for use in accelerometers, pressure gauges, temperature transducers, and the like, comprises a sputter deposited, multilayer, magnetoresistive field sensor with a variable electrical resistance based on an imposed magnetic field. The device detects displacement by sensing changes in the local magnetic field about the magnetoresistive field sensor caused by the displacement of a hard magnetic film on a movable microstructure. The microstructure, which may be a cantilever, membrane, bridge, or other microelement, moves under the influence of an acceleration a known displacement predicted by the configuration and materials selected, and the resulting change in the electrical resistance of the MR sensor can be used to calculate the displacement. Using a micromachining approach, very thin silicon and silicon nitride membranes are fabricated in one preferred embodiment by means of anisotropic etching of silicon wafers. Other approaches include reactive ion etching of silicon on insulator (SOI), or Low Pressure Chemical Vapor Deposition of silicon nitride films over silicon substrates. The device is found to be improved with the use of giant magnetoresistive elements to detect changes in the local magnetic field.

18 Claims, 3 Drawing Sheets

ULTRA-SENSITIVE MAGNETORESISTIVE DISPLACEMENT SENSING DEVICE

ORIGIN OF THE INVENTION

The invention described herein was made in performance of work under a NASA contract, and is subject to the provisions of Public Law 96-517 (35 U.S.C. §202) in which the Contractor has elected not to retain title.

BACKGROUND OF THE INVENTION

1. Field of the Invention

This invention relates generally to microelectromechanical system (MEMS) microsensors, and in particular to a sensor and method for making a sensor that operates using a relative movement between a magnetoresistive element, a movable microstructure such as a bridge, diaphragm, membrane, or cantilever beam, and a hard magnetic film. The device functions to interpret a relative displacement of the movable microstructure with respect to the MR or GMR element from a detected change in the local magnetic field, which in turn can be used to measure acceleration, pressure, temperature, or vibration.

2. Description of Related Art

Microelectromechanical sensors (MEMS) have been previously based on various physical principles such as piezoelectricity, tunneling, elasticity, capacitance, optical interference, and so forth. For example, a measurement of acceleration is required for many everyday applications such as guidance control, detonation, shock, and vibration measurement. The technology for measuring acceleration has included electromechanical, piezoelectric, piezoresistive, and capacitive acceleration sensors. There are physical limitations of each of the aforementioned technology which limit the sensitivity and, consequently, the accuracy of these accelerometers.

All accelerometers are fundamentally displacement measuring devices that operate using the conversion of acceleration into a force, causing a displacement, which is then turned into an electrical signal. This displacement is resisted by a calibrated spring or its functional equivalent. Using Newton's second law of physics and Hooke's law of springs, an equation can be derived relating acceleration to displacement:

$$F = ma \quad \{1\}$$

$$F = -kx \quad \{2\}$$

$$\therefore a = -kx/m \quad \{3\}$$

Where F=force, m=Mass, a=Acceleration, k=spring constant, and x=displacement. Equations describing accelerometers are simple and well known. Accelerometers measure "a" by knowing "k" and "m", observing "x" and using Eq {3}.

Some current microelectromechanical sensors operate under tunneling tip technology. Aside from the uncertainty issues concerning the electrical behavior of tunneling tip technology, as well as manufacturing problems, these designs require tip spacing of approximately 1 nanometer. Establishing this spacing is difficult, unreliable once set, and problematic to maintain during operation. Problems associated with impact during tip setting leads to rejection of parts as a result of the damage caused.

The Magnetoresistive Effect

The "Magnetoresistive (MR) effect was discovered in perfect-crystal samples exposed to very high magnetic fields. The effect was also recently discovered in sputtered metallic thin films consisting of magnetic layers a few nanometers thick separated by equally thin nonmagnetic layers (Giant Magnetoresistive elements, or "GMR"). A large decrease in the resistance of these films is observed when a magnetic field is applied. The cause of this effect is the spin dependence of electron scattering and the spin polarization of conduction electrons in ferromagnetic metals. With layers of the proper thickness, adjacent magnetic layers couple antiferromagnetically to each other with the magnetic moments of each magnetic layer aligned antiparallel to the adjacent magnetic layers.

A change in the magnetic orientation of the sensing layer will cause a change in the resistance of the combined sensing and pinned layers. The GMR sensor materials have two spin states, known as "spin up" and "spin down." Conduction electrons with a spin direction parallel to a material's magnetic orientation move freely, producing a lower electrical resistance. Conversely, conduction electrons with a spin direction opposite to the materials' magnetic orientation are hampered by more frequent collisions with atoms in the material, resulting in a higher electrical resistance. The size of this decrease in resistivity can be 10% to 20% and higher in GMR materials with multiple nonmagnetic layers.

SUMMARY OF THE INVENTION

The present invention is an ultrasensitive displacement determining sensor which employs a sputter deposited, multilayer magnetoresistive or giant magnetoresistive field sensor. For the purposes of this disclosure, it is to be understood that the invention may be practiced with either an MR or a GMR element, and that the term "magnetoresistive element" refers generally to either type. For illustration purposes, the GMR element will be described below. The sensor includes a micromachined microstructure, such as a membrane, cantilever beam, or bridge, diaphragm, with a sputtered, hard magnetic film deposited on the microstructure. The GMR sensor detects displacement by sensing changes in magnetic field caused by the movement of the hard magnetic film on the microstructure.

In one preferred embodiment, utilizing a bulk micromachining approach, very thin (0.5–1 $\mu$m) silicon and silicon nitride membranes are fabricated by means of anisotropic etching of silicon wafers and/or reactive ion etching of silicon on insulator (SOI) or Low Pressure Chemical Vapor Deposited (LPCVD) silicon nitride films over silicon substrate. A hard magnetic thin film is deposited over the silicon nitride microstructure to impose a magnetic field on the GMR element. The GMR element is a multilayer device comprising a sensing layer, conducting spacer, a pinned layer, and an exchange layer, and space layers to avoid the diffusion between the sensing layer and conducting spacer. By passing a current through the GMR sensor and monitoring the electrical characteristics of the sensor, the magnetic field, and thus the displacement of the microstructure, can be determined.

The thickness of each layer of the GMR sensor is very thin—on the order of angstroms (Å)—except for the exchange layer which will allow the conduction of electrons to frequently move back and forth between the sensing and pinned layers via the conducting spacer. The magnetic orientation of the pinned layer is fixed and held in place by the adjacent exchange layer, while the magnetic orientation of the sensing layer changes in response to the external magnetic field.

The GMR sensor directly detects the magnetic field, and is sensitive to small changes in the magnetic field. The sensor is especially suited to measure position or displacement in linear and rotational systems. One application involves the placement of a sensor on a tunneling tip to accurately place the tip with respect to the substrate. Because such devices are manufactured using established thin film deposition of magnetic materials used in the data storage industry, many processing problems have already been addressed. Moreover, because the field may be varied depending on film thickness, potential for damage during fabrication can be alleviated by maintaining relatively significantly greater spacing than is currently used. Furthermore, the detection of magnetic field strength is a very well understood and monitored phenomenon, nanometer and sub-nanometer displacements can accurately be measured.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a sensor for detecting displacement on the order of nanometers.

The present invention comprises an MR or GMR sensor and a microstructure with a sputtered, hard magnetic film. The primary advantage of a GMR sensor over a magnetoresistive (MR) element is a greater sensitivity to magnetic fields. This increased sensitivity makes it possible to detect smaller change in the magnetic fields, and to detect the fields more accurately. Large signals from GMR elements also help to overcome electronic noise. The difference between MR and GMR sensors is sensitivity, measured by percent change in resistance. In MR sensors a resistance change is caused by the bulk intrinsic properties of the sensing layer. In a GMR sensor a resistance change is caused by the quantum nature of electrons.

The present invention comprises a GMR element working in combination with a microstructure which moves under the influence of an acceleration. A reliable giant magnetoresistive microelectromechanical system (MEMS) device should have the following characteristics: a significant percentage change in resistance, high field resistance, low resistance noise, and a high bandwidth. These characteristics are very sensitive to the thickness of the various layers in the multilayers of the device, as well as the composition and crystallographic arrangement of the individual layers.

Principle of Operation

Figure 1:
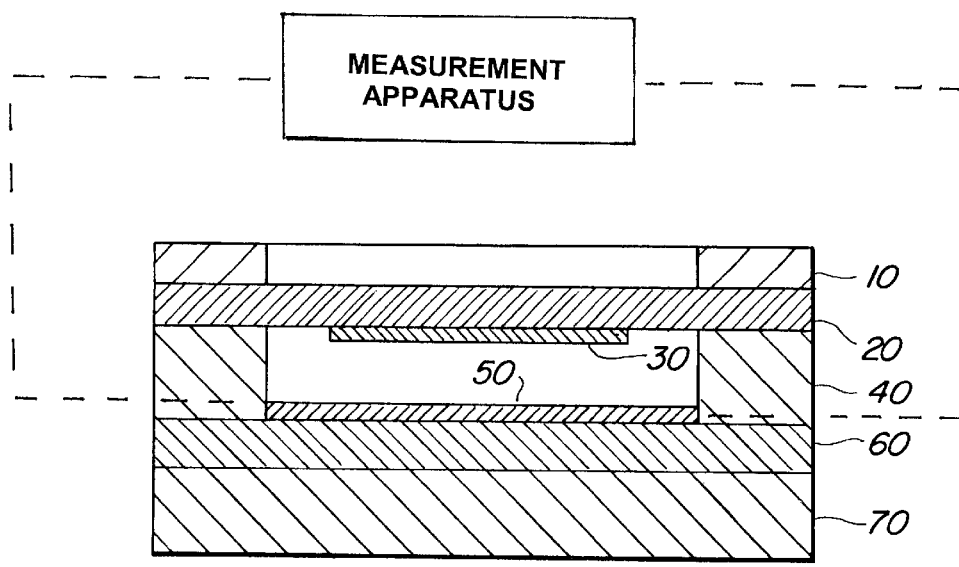
FIG. 1 is a schematic side view of a preferred embodiment of the present invention.

The magnetic field H adjacent to hard magnetic thin film will hold the following relationship:

$$H = H_o e^{-\alpha d/\lambda} \quad \{4\}$$

Where $\alpha$ is the constant of order, $\lambda$ is the average distance between domains in the magnet and d is the distance between the GMR sensor and the hard magnetic thin film which certainly depends on the acceleration. A hard magnetic thin film is fabricated on a substrate such that the distance between domains is $\lambda$. A magnetoresistive (MR) or giant magnetoresistive (GMR) sensor is fabricated adjacent the film, where one of the two is located on a moveable element and the other mounted adjacent thereto. The movable element may be a diaphragm, bridge, cantilever beam, membrane, or other movable element. Turning to FIG. 1, in a preferred embodiment, the movable element includes the thin magnetic film, and is weakly linked to the GMR/MR sensor. Alternatively, the GMR/MR sensor can be mounted to the movable element and the hard magnetic film is disposed on the substrate. The remaining discussion will describe an embodiment where the hard magnetic film is deposited on the movable microstructure and the magnetoresistive element is fixed with respect to the movable microstructure, but it is to be understood that the invention may operate under the same principles discussed herein if the hard magnetic film is fixed and the magnetoresistive element moves with the microstructure. In either configuration the distance between the sensor and the film is "d." An acceleration perpendicular to the plane of the thin film results in a change in the distance d. The magnetic field H away from the hard magnetic film is given in equation $\{4\}$. Here $\alpha$ is a constant of order one, depending on the particulars of the magnetic domains of the film. The magnetic domains can be oriented either in the plane of the film or vertical to the film plane. The magnetoresistive sensor has a resistance R which depends on the local field H at the sensor. Thus, if the resistance is used to measure the field intensity, the displacement d can be determined accurately.

An assessment of the accuracy and response bandwidth can be made by considering the signal and the noise associated with the signal. Generally, the GMR or MR element is characterized by its change in resistance $\Delta R$ when the field changes by an amount $\Delta H$. The ratio of $\Delta R/\Delta H$ is nominally in the range of $0.001\Omega/\text{Oe}$ (ohms per oersted). A typical small displacement to be measured is on the order of one nanometer. For typical values, a 1 nm displacement in the sensor distance d will produce a change in sensor voltage of 0.0001 Volts. A typical noise voltage for typical parameters is 50 $nV/(Hz)^{1/2}$. A typical bandwidth for an accelerometer as determined by equating the product of the bandwidth of the sensor and the noise to the signal, yielding a bandwidth of 5 megahertz, or a response time of 0.2 microseconds. The sensitivity and response time of the device can be adjusted by varying the coupling between the movable microstructure and the fixed magnetoresistive element, as well as the geometry of the microstructure, i.e., thicker membranes, shorter beams, and so forth.

Manufacturing the Device

DC magnetron sputtering was used to sputter multilayers in a UHV chamber with a base pressure $1 \times 10^{-8}$ Torr. Silicon dioxide was grown over silicon, which is used as the substrate in the preferred embodiment described herein. While silicon is a preferred substrate, other substrate materials can be used depending on the preferred performance characteristics. The sputtering was performed at room temperature using an ambient argon pressure of 1 mTorr. The silicon dioxide/silicon substrate was mounted 6 inches away from the target in the vacuum chamber. Sputtering power was 40 watts for tantalum, 50 watts for cobalt and Permalloy, 30 watts for iron-manganese and 30 watts for copper for deposition rates around 1 Å/s. The resulting structure of the spin valve (see FIG. 2) is silicon/silicon dioxide/tantalum 50 Å/copper 23 Å/cobalt 50 Å/ FeMn 120 Å/ Tantalum 50 Å. Since changing the layer thickness changes the magnetic coupling between the layers, a 10 to 15 Å cobalt layer was inserted between the Permalloy layer and the copper layer to boost the GMR ratio, and to prevent diffusion of the Permalloy and copper.

Table 1 shows the deposition parameters employed to deposit the GMR device stack layers using the magnetron sputtering technique.

TABLE 1

Sputter Deposition of the Multilayers in UHV Chamber to fabricate GMR Element

| | |
|---|---|
| Base pressure | $1 \times 10^{-8}$ Torr |
| Substrate | Thermally grown $SiO_2$/Si |
| Pressure | 1 mTorr |
| Temperature | $20 \pm 5°$ C. |
| Substrate-target separation | 6 inches (15.2 cm) |
| Sputtering power | 40 W (Ta) |
| | 50 W (Co and Permalloy) |
| | 30 W (FeMn, Cu) |
| Deposition rate | 1 Å/sec |

The GMR characteristics are influenced by many factors, including: the thickness of the copper spacer layer, temperature stability, electrostatic discharge, change in magnetization, lift off technique approach, annealing of hard magnetic thin film, and the field damages. Issues associated with the reliability of GMR sensors are thickness control of the copper spacer layer. Spin valves have the highest sensitivity with a copper spacer around 23 Å. The other critical issue is the temperature stability.

The spin valve of one preferred embodiment uses an IrPtMn antiferromagnetic layer as a pinning layer. This layer can withstand cycling above 350° C. While cobalt and copper do not mix at moderate temperatures, Permalloy and copper readily mix if placed in intimate contact, which would cause the spin valve to degrade at approximately 200° C. The GMR layers are extremely thin, only about 300–400 Å. There is a potential of the magnetization changing if the temperature of the layer exceeds the annealing temperature of the antiferromagnetic layer in robust applications. The GMR material should have resistance to electrostatic discharge and resistance to thermal degradation.

A dogbone structure was used to fabricate GMR elements that have a resistance, R, that depends on the local field, H, acting on the GMR sensor. If the resistance is used to measure field intensity the displacement, d, may be determined with a simple inversion of the function H as described in Eq $\{4\}$.

Fabrication of GMR Sensor

The fabrication of the GMR sensor comprises three steps: 1. Fabrication of GMR sensor on the substrate; 2. Fabrication of the movable microstructure such as a membrane, a cantilever beam, a diaphragm, or a bridge; and 3. Deposition of a hard magnetic thin film on the movable microstructure. Critical issues associated with the fabrication/operation of the device are signal to noise ratio, geometry and lithographic definition of the spin valve on the substrate, magnetic properties of the hard magnetic thin film, and process integration with surface and bulk micromachining processes.

STEP 1—Patterning of Spin Valve

The GMR element may be fabricated using several layers of various metallic thin films patterned by using photolithography. Patterning of a GMR element may be achieved by hydrochloric acid plasma, lift-off technique, ion milling, or chemical etching. Chemical etching may not yield fruitful results of patterning since the GMR element consists of various multilayers that could form galvanic couples in the chemical solutions. Different layers can be etched at different rates in the chemical etching solutions due to the preferential attack. In a preferred method a single step self-aligned photolithographic lift-off technique may be used to attain the patterning of GMR elements. There may be some technical problems associated with the poor edge definition of GMR elements in the lift-off technique. Therefore, other techniques such as HCl plasma and ion milling may be used in the GMR element fabrication.

STEP 2—Fabrication of Moving Microstructure

A moving microstructure of silicon, silicon nitride, or silicon dioxide may be fabricated using various approaches. A silicon membrane may be fabricated using anisotropic etching of silicon using a silicon nitride mask and a potassium hydroxide solution at 60° C. However, it is very difficult to fabricate a silicon membrane of 1 μm or less using this chemical etching solution approach. A silicon membrane may also be fabricated using a plasma-etching approach. Deep reactive ion etching (RIE) technique has been used to etch the silicon substrate at a rate of 5–10 μm/min using Al as a mask to fabricate the membranes. It has been observed that there will be a micromasking effect with aluminum in the RIE etched area. Thick photoresist has been also been used as a mask to etch silicon by RIE to fabricate silicon membranes. However, it is difficult to fabricate 1 μm or less thick silicon membranes by RIE since the etching rate is significantly high. Therefore, in a second preferred method a silicon on insulator (SOI) substrate could be employed to fabricate silicon membranes. One may etch silicon either by RIE or chemical etching solutions. It is relatively simple to fabricate 3–5 μm thick silicon membranes using RIE etching. However, 1 μm or less thick silicon membranes are needed in some applications to provide sufficient mechanical travel to implement in the GMR sensor device, making this method more difficult.

In a third preferred method, a silicon nitride membrane is fabricated, which is stable in KOH solutions. Silicon nitride is grown on both sides of a silicon substrate using low-pressure chemical vapor deposition (LPCVD). The $Si_3N_4$ is patterned and plasma etched down to the silicon substrate. The silicon substrate is etched in KOH solution until the other silicon nitride layer is reached. Thus a 0.5 μm silicon nitride membranes is fabricated over the silicon substrates.

STEP 3—Depositing a Hard Magnetic Thin Film

A hard magnetic thin film element is deposited over the moving microstructure (membrane, cantilever beam, diaphragm, or a bridge) and patterned using an appropriate technique. The lift-off technique may be used to pattern the hard magnetic thin film. Depositing 50 to 100 Å thick layer of Cr by magnetron sputtering will facilitate adhesion. Co-sputtering of Co(80%) Cr(14%) Ta(5%) Pt(up to 1%) is deposited by lift-off technique. The resulting thickness of the hard magnetic thin film will be around 2000 Å.

The schematic of the complete device is shown in FIG. 1. In this preferred embodiment, the elements are fabricated over two silicon chips and finally bonded by an appropriate technique. Silicon 10 is a preferred substrate, and silicon nitride 20 is deposited using a LPCVD technique. One side of the silicon/silicon nitride substrate is completely etched (either by plasma or hot phosphoric acid solution), while protecting the silicon nitride 20 on the other side of the silicon substrate 10. Thermally grown silicon dioxide 40,60 is grown on the silicon substrate where the silicon nitride was etched. The oxide is patterned and etched in the buffered oxide etch (BOE). The hard magnetic thin film 30 is deposited and patterned on the moving microstructure. The Silicon nitride surface 70, on the opposite side of silicon substrate, is patterned and plasma etched to the silicon substrate. The hard magnetic thin film 30 is protected and the substrate is anisotropically etched to the silicon nitride thin film. This produces the moving microstructure with a hard magnetic thin film pattern, with the magnetoresistive element 50 disposed adjacent the hard magnetic film 30. In another preferred embodiment, the growth of silicon dioxide 40,60 was performed by thermal oxidation. The GMR 50 element may be fabricated using lift off technique on the silicon dioxide 60. These two chips are bonded using anodic bonding or any other appropriate technique to assemble the device as shown in the FIG. 1.

Figure 2:
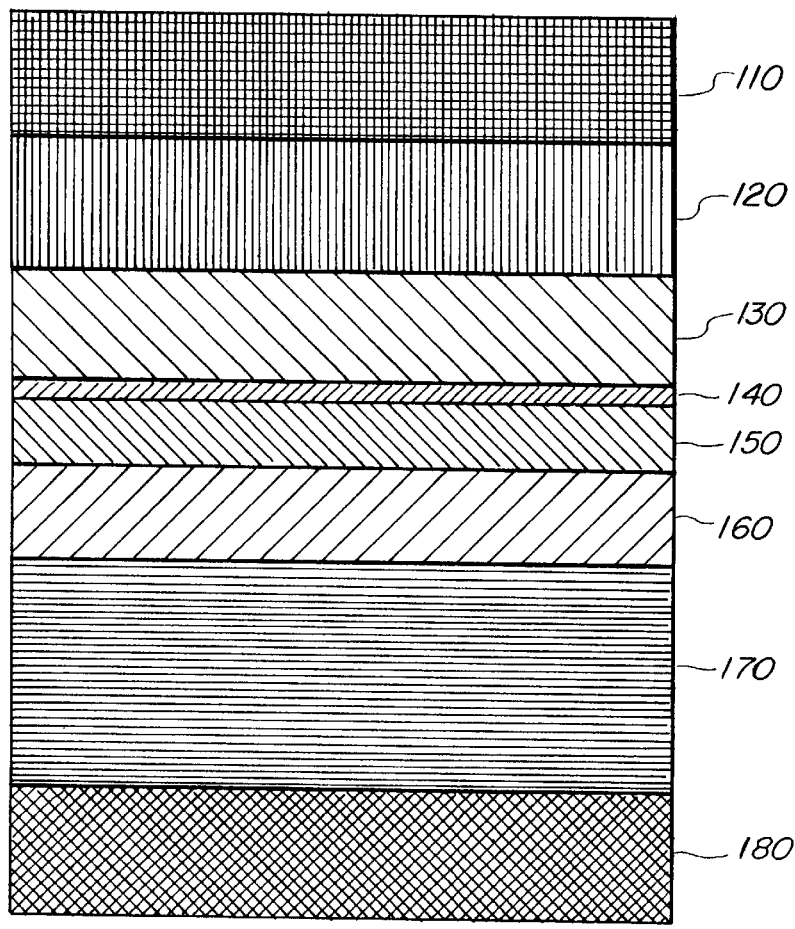
FIG. 2 is a schematic side view of a preferred embodiment of a giant magnetoresistive element of the present invention.

The schematic diagram of the GMR element fabrication is shown in FIG. 2. A silicon substrate 110 is oxidized by thermal oxidation. The photoresist is spin coated and patterned using photolithography. Tantalum 120 is deposited for conductivity and to isolate the Permalloy from the silicon dioxide. A sensing layer of Permalloy 130 is deposited. Subsequently cobalt 140, copper 150, cobalt 160, iron-manganese 170, and finally tantalum 180 are deposited in the same deposition set-up using the same vacuum chamber. Cobalt is deposited to separate the mixing of permalloy and copper, and also the mixing of iron-manganese and copper. Copper is deposited to act as an intermediate layer in this device. The top tantalum layer is deposited to protect the device from oxidation and contamination with other impurities. Total thickness of all the deposited layers in the fabricated device is approximately 284.8 Å (28.48 nm).

Figure 3:
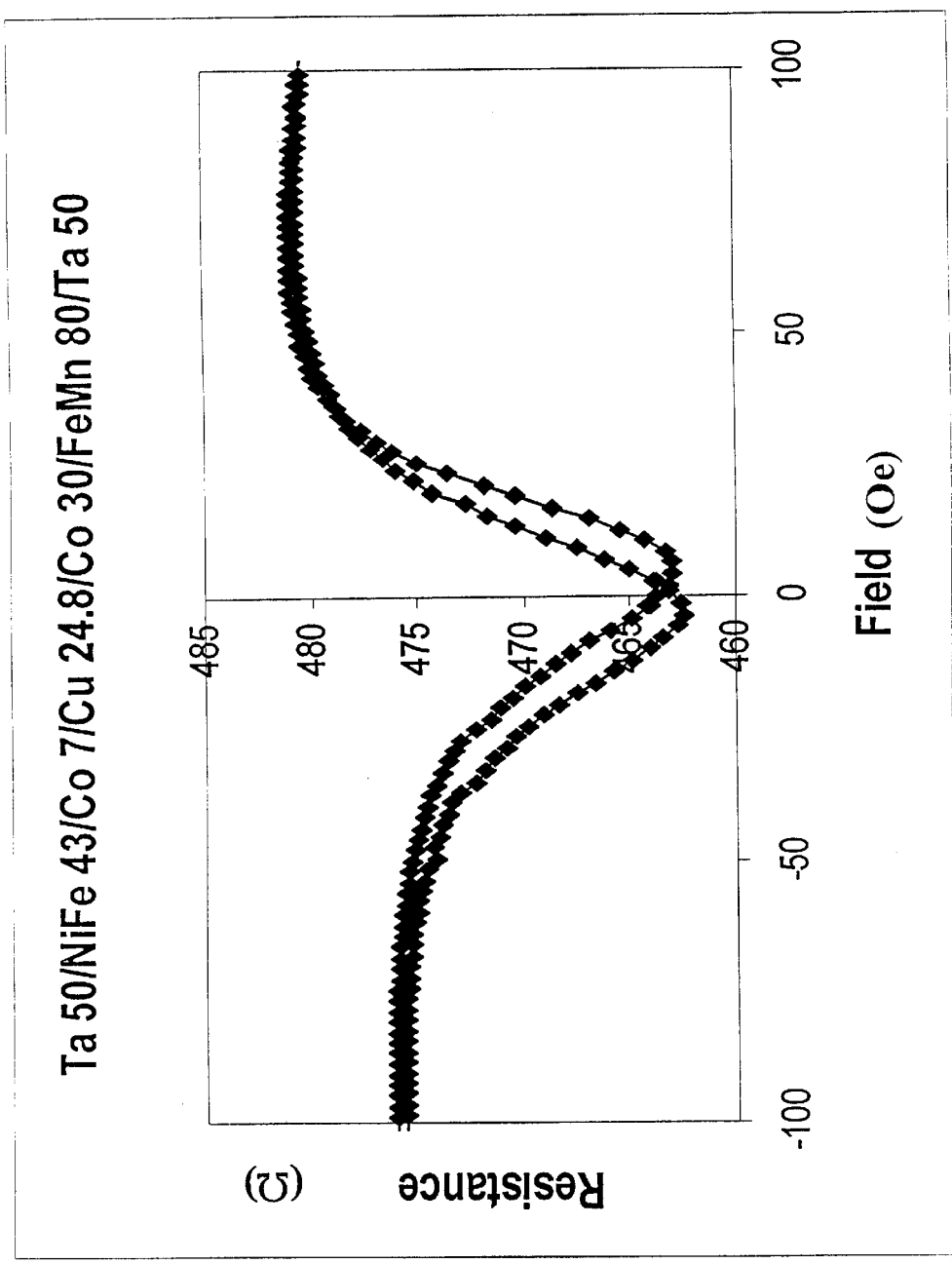
FIG. 3 is a plot of resistance change in a GMR sensor versus an applied magnetic field.

During the growth of the GMR sensor, a magnetic field is applied to the sample to induce soft and hard axes in the magnetic layers and set the direction for the pinning field in the antiferromagnetic layer. In operation the magnetic field to be sensed is applied parallel to the hard axis since there is very little hysteresis along this direction and the response is linear for small changes in the field. FIG. 3 is a typical plot of the resistance change versus the field applied along the hard axis for the GMR of a preferred embodiment. The resistance in the GMR changed by about 3.9% over the entire field range. There are some manufacturing issues with the liftoff that lead to a less than ideal GMR curve in FIG. 3. Specifically, any surface contamination left after the development of the photoresist will result in rough layers. Rough or wavy interfaces in GMR device increases the ferromagnetic coupling between the two magnetic layers. Also, if the walls of the photoresist were not perfect additional magnetic coupling could arise.

Figure 4:
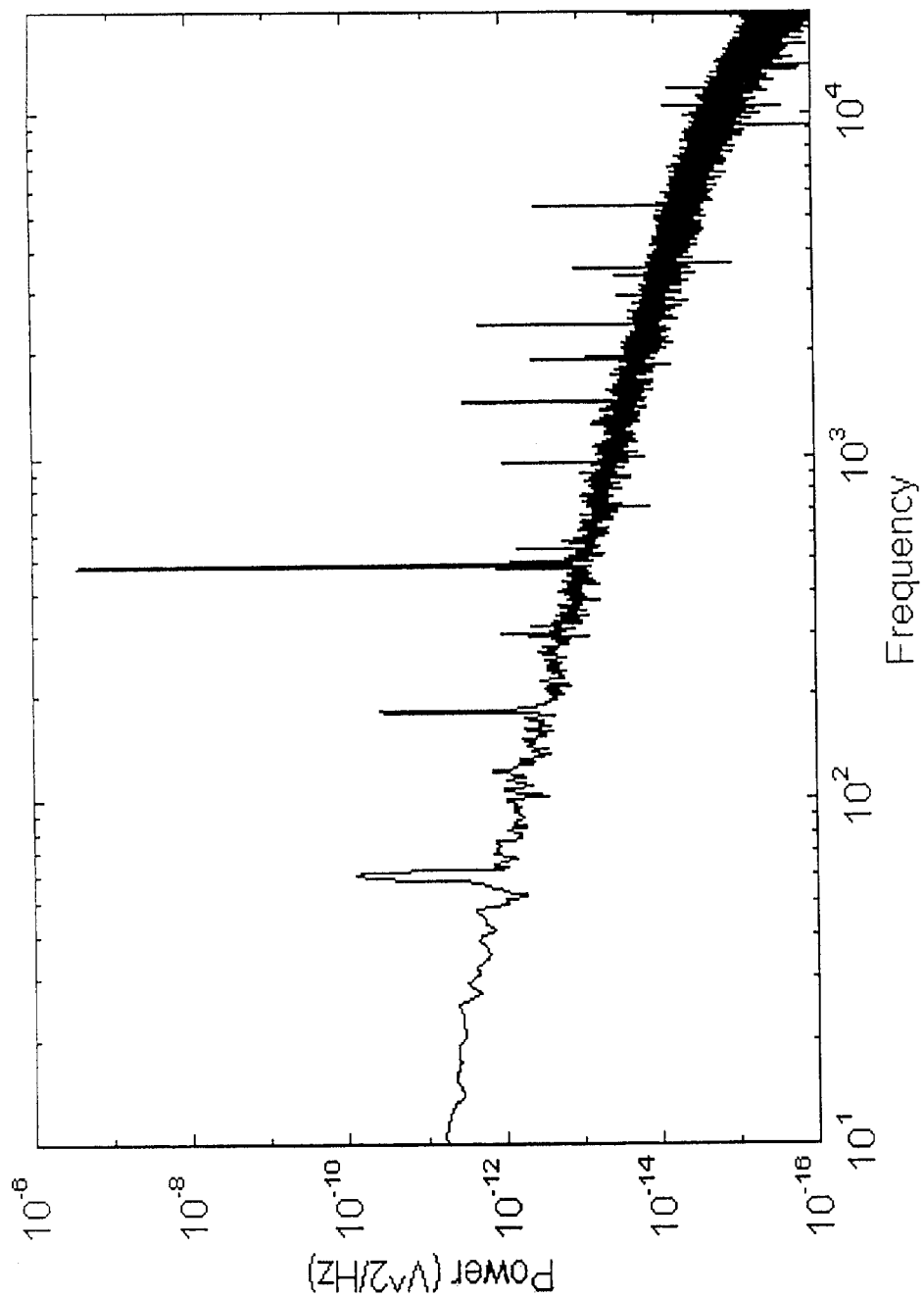
FIG. 4 is a plot of power versus frequency when an AC field is applied to a GMR sensor.

The power versus the frequency when an AC field was applied to the GMR device along with a DC bias field of 15 Oe is shown in FIG. 4. The magnitude of the field applied was 0.6 Oe (500 Hz sine wave) and the current through the device was 6 mA. The absence of higher harmonic peaks indicates that there was little distortion and an output of pure sine wave. The baseline noise is most probably due to intrinsic 1/f noise in the spin valve. The 1/f noise is the dominant noise source until about 20 KHz. The magnitude of the 1/f noise increases as the square of the current. However, depending on the current, at higher frequencies, thermal noise will dominate.

Table 2 shows the some of the experimental spin valve configurations tested. Adding the cobalt layer in the GMR device structure significantly improved the device characteristics.

TABLE 2

The change in resistance as a function of spin valve configuration

| Device # | Spin Valve Configuration | ΔR/R | Oe |
|---|---|---|---|
| 1 | Co/Cu/Co/FeMn | 9.9% | 0.81 |
| 2 | NiFe/Cu/NiFe/FeMn | 4.3% | 1.51 |
| 3 | NiFe/Co/Cu/Co/NiFe/FeMn | 9.1% | — |

Table 3 shows test results on some of the GMR devices fabricated. The change in resistance was high (6.3%) with a thick cobalt layer and the Permalloy layer absent. A Permalloy layer was incorporated in device 2 and the cobalt layer thickness was reduced to 15 Å. The change in resistance decreased to 4.5%. The cobalt layer was completely eliminated in device 3 and the change in resistance further decreased. The copper layer thickness used was approximately 44 Å, which was different from the critical thickness required to obtain high change in resistance.

TABLE 3

GMR Device Test Results

| Device # | Ta (Å) | Py (Å) | Co (Å) | Cu (Å) | Co (Å) | Py (Å) | FeMn (Å) | Ta (Å) | ΔR/R |
|---|---|---|---|---|---|---|---|---|---|
| 1 | 64 | — | 50 | 44 | 50 | — | 80 | 64 | 6.3% |
| 2 | 50 | 50 | 15 | 44 | 15 | 50 | 80 | 50 | 4.5% |
| 3 | 50 | 50 | — | 44 | — | 50 | 80 | 50 | 1.6% |

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A microelectromechanical system (MEMS) for sensing displacement comprising:

a substrate carrying a magnetoresistive element including a copper layer sandwiched by a pair of cobalt layers, said magnetoresistive element having a variable electrical characteristic determined by a local magnetic field;

a movable silicon nitride microstructure carrying a hard magnetic film, wherein said hard magnetic film is sputtered onto said movable microstructure, said hard magnetic film has a thickness of between 1000 Å and 3000 Å, and includes a composition to cobalt, chromium, tantalum, and platinum, said movable microstructure traveling along a predetermined direction towards, and away from, said magnetoresistive element, and a displacement of said movable microstructure and said hard magnetic film in the predetermined direction is correlated with a force in the predetermined direction, and means for measuring a change in the variable electrical characteristic of said magnetoresistive element whereby said change in the variable electrical characteristic is due to a change in the local magnetic field attributable to said displacement of said hard magnetic film on said movable microstructure, and whereby the change in the magnetic field is used to determine the displacement of said movable microstructure in the predetermined direction.

2. The microelectromechanical system of claim 1 wherein said movable microstructure comprises a bridge.

3. The microelectromechanical system of claim 1 wherein said movable microstructure comprises a diaphragm.

4. The microelectromechanical system of claim 1 wherein said movable microstructure comprises a cantilever beam.

5. The microelectromechanical system of claim 1 wherein said movable microstructure comprises a membrane.

6. The microelectromechanical system of claim 5 wherein said movable microstructure comprises a silicon nitride membrane fabricated over a silicon substrate using low-pressure chemical vapor deposition and plasma etching.

7. The microelectromechanical system of claim 5 wherein said movable microstructure comprises a silicon nitride membrane having a maximum thickness of 0.5 microns.

8. The microelectromechanical system of claim 1 wherein said hard magnetic film comprises a composition of cobalt, chromium, tantalum, and platinum in the proportion of 80:14:5:1 respectively, by weight.

9. The microelectromechanical system of claim 1 wherein the magnetoresistive element is a giant magnetoresistive element comprising:
   a sensing layer;
   a conducting spacer layer;
   a magnetically pinned layer; and
   an exchange layer;
   wherein the exchange layer permits conduction of electrons between the sensing layer and the magnetically pinned layer via the conducting layer.

10. The microelectromechanical system of claim 9 wherein the pinned layer is an antiferromagnetic layer comprising iridium, platinum, and manganese.

11. The microelectromechanical system of claim 9 wherein the giant magnetoresistive element comprises:
   an oxidized silicon substrate;
   a first layer of tantalum on the oxidized silicon substrate;
   a layer of Permalloy on the first layer of tantalum;
   a first layer of cobalt on the layer of Permalloy;
   a layer of copper on the first layer of cobalt;
   a second layer of cobalt on the layer of copper;
   a layer of iron-manganese on the second layer of cobalt; and
   a second layer of tantalum on the layer of iron-manganese;
   where each layer is deposited in a common vacuum chamber.

12. The microelectromechanical system of claim 11 further including a second layer of permalloy between the second layer of cobalt and the layer of iron-manganese.

13. The microelectromechanical system of claim 11 wherein the total thickness of the deposited layers of the giant magnetoresistive element is between 324 Å and 354 Å.

14. The microelectromechanical system of claim 9 wherein the giant magnetoresistive element has a characteristic resistance change of 0. 1 ohms per oersted.

15. The microelectromechanical system of claim 9 wherein the giant magnetoresistive element has a percentage change of resistance of less than 5 percent.

16. An accelerometer sensor comprising:
   a movable microstructure having a direction of travel along a direction for which acceleration is to be measured, said movable microstructure including a hard magnetic film deposited thereon such that said hard magnetic film travels with said movable microstructure;
   a giant magnetoresistive element mounted adjacent said movable microstructure and positioned normal to a line defining the direction for which acceleration is to be measured, said giant magnetoresistive element consisting of:
      at least two layers of tantalum;
      at least two layers of cobalt;
      at least one layer of copper;
      at least one layer of iron-manganese; and
   wherein the electrical resistance of the giant magnetoresistive element varies according to an imposed magnetic field;
   wherein the displacement of the movable microstructure and the hard magnetic film towards and away from the giant magnetoresistive element affect the imposed magnetic field and consequently the electrical resistance in said giant magnetoresistive element.

17. A microelectromechanical system (MEMS) for sensing displacement comprising:
   a substrate carrying a hard magnetic film;
   a movable microstructure carrying a magnetoresistive element including a copper layer sandwiched by a pair of cobalt layers, said movable microstructure traveling along a predetermined direction towards, and away from, said hard magnetic film, said magnetoresistive element having a variable electrical characteristic determined by a local magnetic field where said local field is affected by the position of said magnetoresistive element relative to said hard magnetic film, and a displacement of said movable microstructure and said magnetoresistive element in the predetermined direction is correlated with a force in the predetermined direction; and
   means for measuring a change in the variable electrical characteristic of said magnetoresistive element whereby said change in the variable electrical characteristic is due to a change in the local magnetic field attributable to said displacement of said movable microstructure, and whereby the change in the magnetic field is used to determine the displacement of said movable microstructure in the predetermined direction.

18. The microelectromechanical system of claim 17 wherein the copper layer has a thickness less than half the combined thickness of the pair of cobalt layers.

* * * * *